United States Patent
Wennerström

(10) Patent No.: US 11,690,460 B2
(45) Date of Patent: Jul. 4, 2023

(54) AIR PURIFICATION TENT

(71) Applicant: Blueair AB, Stockholm (SE)

(72) Inventor: Johan Daniel Wennerström, Sollentuna (SE)

(73) Assignee: Blueair AB, Stockholm (SE)

( * ) Notice: Subject to any disclaimer, the term of this patent is extended or adjusted under 35 U.S.C. 154(b) by 605 days.

(21) Appl. No.: 16/314,754

(22) PCT Filed: Jul. 5, 2017

(86) PCT No.: PCT/SE2017/050752
§ 371 (c)(1),
(2) Date: Jan. 2, 2019

(87) PCT Pub. No.: WO2018/009133
PCT Pub. Date: Jan. 11, 2018

(65) Prior Publication Data
US 2019/0150628 A1     May 23, 2019

(30) Foreign Application Priority Data

Jul. 5, 2016   (SE) .................................... 1630175-6

(51) Int. Cl.
*A47C 21/04*     (2006.01)
*E04H 15/16*     (2006.01)
(Continued)

(52) U.S. Cl.
CPC ............ *A47C 21/04* (2013.01); *A47C 29/003* (2013.01); *B01D 46/0032* (2013.01);
(Continued)

(58) Field of Classification Search
CPC . A47C 21/00; A47C 21/04; A47C 29/00–003; F24F 3/00; F24F 3/12;
(Continued)

(56) References Cited

U.S. PATENT DOCUMENTS

| 4,050,661 | A | 9/1977 | Wooldridge |
| 4,547,092 | A | 10/1985 | Vetter et al. |

(Continued)

FOREIGN PATENT DOCUMENTS

| CN | 2043846 | 9/1989 |
| CN | 2055916 | 4/1990 |

(Continued)

OTHER PUBLICATIONS

Search Report and Written Opinion in PCTSE2017050752.
(Continued)

*Primary Examiner* — Rachel T Sippel
*Assistant Examiner* — Jacqueline M Pinderski
(74) *Attorney, Agent, or Firm* — Greenberg Traurig, LLP

(57) ABSTRACT

An air purifying bed tent is disclosed, having a tent made from a semipermeable material suspended over a raised platform, thereby creating an enclosure for a user to be inside. An air purifying device is connected to the top of the tent, letting purified air into the enclosure and creating a local clean air zone for users. The positive pressure difference building up in the enclosure from the constantly added clean air forces clean air out through a plurality of openings, primarily through creases in the semipermeable material around the raised platform. Should the skirting be completely sealed, the semipermeable material will let out the pure air to a higher degree, ensuring a stable and easy touse operation.

9 Claims, 7 Drawing Sheets

(51) Int. Cl.
  *F24F 3/163* (2021.01)
  *A47C 29/00* (2006.01)
  *B01D 46/00* (2022.01)
  *B01D 46/02* (2006.01)
  *B01D 53/04* (2006.01)
  *B03C 3/12* (2006.01)
  *E04H 15/10* (2006.01)
  *F24F 8/108* (2021.01)
  *E04H 15/04* (2006.01)

(52) U.S. Cl.
  CPC ............ *B01D 46/02* (2013.01); *B01D 53/04* (2013.01); *B03C 3/12* (2013.01); *E04H 15/10* (2013.01); *E04H 15/16* (2013.01); *F24F 3/163* (2021.01); *B01D 2253/102* (2013.01); *B01D 2259/45* (2013.01); *B01D 2279/50* (2013.01); *E04H 15/04* (2013.01); *F24F 8/108* (2021.01); *F24F 2221/10* (2013.01); *F24F 2221/14* (2013.01)

(58) Field of Classification Search
  CPC .. F24F 3/16–163; F24F 8/108; F24F 2221/10; F24F 2221/14; E04H 15/14–16; E04H 15/10; E04H 15/04; B01D 46/00; B01D 46/0027; B01D 46/0032; B01D 46/02; B01D 53/04; B01D 2253/102; B01D 2259/45; B01D 2279/50; B03C 3/12
  USPC .................................................. 128/205.26
  See application file for complete search history.

(56) References Cited

U.S. PATENT DOCUMENTS

| | | | |
|---|---|---|---|
| 4,796,846 A | 1/1989 | Meier et al. | |
| 5,578,112 A * | 11/1996 | Krause | B03C 3/86 96/24 |
| 5,832,919 A * | 11/1998 | Kano | A62B 31/00 128/205.26 |
| 6,056,808 A | 5/2000 | Krause | |
| 6,119,689 A * | 9/2000 | Korman | B01D 46/002 128/205.12 |
| 6,203,600 B1 * | 3/2001 | Loreth | B03C 3/86 96/40 |
| 6,317,910 B1 * | 11/2001 | Wilson | A47C 29/003 135/96 |
| 6,367,476 B1 | 4/2002 | Conn | |
| 6,508,850 B1 * | 1/2003 | Kotliar | A61G 10/04 55/385.2 |
| 2004/0009746 A1 * | 1/2004 | Korman | A61G 10/04 454/284 |
| 2005/0082160 A1 * | 4/2005 | Botvinnik | F24F 8/192 204/164 |
| 2005/0103370 A1 | 5/2005 | Napier | |
| 2005/0175512 A1 | 8/2005 | Yuen | |
| 2009/0276958 A1 * | 11/2009 | Gururaj | A47C 21/003 5/421 |
| 2010/0233019 A1 * | 9/2010 | Al-Thallab | F24F 3/16 422/4 |

FOREIGN PATENT DOCUMENTS

| | | |
|---|---|---|
| CN | 102920215 | 2/2013 |
| DE | 19621029 | 2/1997 |
| DE | 19651402 | 6/1998 |
| DE | 19836896 | 11/2000 |
| DE | 10327991 | 1/2005 |
| FR | 1391433 | 3/1965 |
| GB | 1157113 | 7/1969 |
| JP | 3108536 | 4/2005 |
| JP | 2012213638 | 11/2012 |
| JP | 2014029821 | 2/2014 |
| KR | 101494677 | 2/2015 |
| KR | 1020150139590 | 12/2015 |
| WO | WO8203164 | 9/1982 |
| WO | WO2011114186 | 9/2011 |
| WO | WO2014182986 | 11/2014 |
| WO | WO2018009133 A1 | 1/2018 |

OTHER PUBLICATIONS

Search Report (Supplementary) and Written Opinion in EP17824635; dated Jul. 10, 2019.
Search Report and Written Opinion in PCTEP2019058187; dated Jul. 19, 2019.
Search Report and Written Opinion EP19152065; dated Aug. 1, 2019.

* cited by examiner

AIR PURIFICATION TENT

FIELD

The present invention is generally directed to the field of room air purifiers, and is more specifically directed to an air purification system that is suspended over a platform to create a clean air zone for users on the platform.

BACKGROUND

Air purifiers have long been known as helping to alleviate respiratory health issues like pollen and pet allergies, asthma, and dust sensitivity. Harmful PM2.5 micro-particles, a by-product from for example combustion engines and coal burning, have a more creeping and sinister effect on the body. The small particles pass through the lung-blood barrier and are carried to different parts of our bodies, where they accumulate. Long exposure to PM2.5 has a real impact on both number of hospital visits in a community as well as mortality rates from lung cancer and respiratory and cardiovascular diseases (Health effects of particulate matter, WHO, 2013).

The most effective air purifiers filter out these PM2.5 particles from the indoor air, preventing them from reaching the respiratory system. There are several different kinds of airborne particle filtration technologies, including mechanical filtration, electrostatic filtration, or a combination of mechanical and electrostatic filtration. For removing unwanted gases such as volatile organic compounds, physical adsorption, photocatalytic oxidization, chemical adsorption, and surface oxidization are methods known in prior art.

Mechanical filtration air purifiers, well documented in prior art, typically include a filtration element, for example a HEPA non-woven fibre filter, a fan or blower to drive the dirty room air through the filter, and a housing to hold the filter and the fan. When the dirty air goes through the filter, the airborne particles are caught on the filter fibre surface, letting particle-reduced air out into the room again.

The filter's efficiency is calculated by counting the particles on both sides of the filter as air is moving through it. However, for the particle reduction in a whole room, more than the filter efficiency must be considered. There are several important factors when keeping a room free from an excess of particle matter: the size of the room, the number and type of sources of particulate matter in the room, the ventilated air exchange rate of the room and the air purifier's airflow to name a few. An air purifier should process the air volume of the room several times in an hour. This means that for large rooms with a high ventilation exchange rate and many particulate matter sources with high output, a strong fan and a large filter surface is needed to keep particulate levels down.

These bigger air purifiers take up more space, have high noise levels and high energy consumption. It is therefore beneficial to only clean the air in the space in the direct vicinity of users. Modern humans spend a significant part of the day in bed, it is therefore favourable to purify the air in the volume directly over the bed surface.

Air purifying tent structures are known in prior art, where an air treatment device is connected to an impermeable enclosure around the bed. In one effort to create a tent (U.S. Pat. No. 6,508,850, Kotliar, 2003) air is drawn into the tent through an opening covered by a filtering membrane. The solution described requires an air treatment device that is placed on the floor of the room, and it requires the enclosure to be totally sealed so as not to draw in dirty room air. This requires a significant effort in sealing the opening through which the user enters the enclosure. Furthermore, the sealed off enclosure might be a technically feasible solution for purifying the air around the bed, but is cumbersome and exaggerated to normal home appliance consumers, and may not be suitable for home and hospitality interiors.

There is consequently a need for a less complex clean air zone enclosure intended to be arranged around a bed. It is also beneficial to design the enclosure and air treatment device so that it can easily fit into home and hospitality interiors.

SUMMARY

The present invention relates to an air purification tent that to at least some extent reduces the drawbacks described above.

The air purification tent according to the invention comprises:

a tent, made from a semipermeable flexible material, said tent is intended to be suspended above a raised platform such that the material is enclosing the platform and enclosed space is created;

an air purification device arranged in the enclosed space, said device comprising an air inlet arranged outside the enclosure, and an air outlet arranged within the enclosure;

wherein air from outside the tent is flowing through the air purifying device and into the enclosed space such that the enclosed space is filled with pure air.

The air purification tent according to the present invention provides an air purification system in the form of a purified air tent above of a raised platform. The tent is suspended over the platform, with its side faces skirting the sides of the platform, creating an enclosure. The top of the tent holds an air purification device, with its air inlet on the outside of the enclosure, and its clean air outlet on the inside of the enclosure such that the enclosure continuously is provided with purified air when the air purification device is activated. It is another aspect of the invention that the tent consists of a semipermeable material that allows air to flow through it at low pressure differences to prevent the pressure from raising within the tent. The claimed air purification tent is very easy to suspend above for example a bed since no complex installation of the tent is required.

Clean air is let out of the air purification device into the enclosure. The clean air fills up the volume of the enclosure and is let out through a plurality of openings: foremost down through the creases of the draped tent sides, but also through possible holes around the not fully sealed closed entry opening. Furthermore, as the enclosure is continuously filled with purified air and the internal pressure of the enclosure rises, the semipermeable enclosure starts letting out air into the room. The plurality of openings and the semipermeable enclosure material ensures a robust and continuous air purification performance that is insensitive to user handling. The opening may not be fully sealed and the enclosure sides may not be fitted hermetically around the platform. The clean air will move from the air purification device down to the openings, ensuring clean breathing air for the user or users. If the opening is fully sealed and the enclosure sides are properly sealed against the platform, the clean air will fill up the enclosure. As a slight positive air pressure will build up on the inside, air is let out through the semipermeable enclosure, again ensuring clean breathing air for the user or users. Further, the positive pressure on the inside of the enclosure hinders polluted room air from entering the enclosure other than through said air purification device.

In one embodiment, the air purification tent comprises a suspension device secured in the air purification device such that the tent is extending downwards from the air purification device to enclose the platform. This embodiment is favorable since the load of the air purification device is supported directly by the suspension device which further simplifies the structure of the air purification tent. The suspension device is for example supported by one or more hooks or support structures in the ceiling or a wall of a surrounding building.

In one embodiment of the air purification tent, the air purification device comprises an upper and a lower side and said air inlet is arranged in the upper side of the air purification device such that the air enters the inlet and flow substantially vertically downwards in the air purification device and exits the air purification device in the lower side of the device. This embodiment provides a very efficient air purifying device with a small overall size.

In one embodiment of the air purification tent, the tent has an opening, or openings, through which the user or users can enter the enclosure. The opening, or openings, can be closed so that the user and the platform is surrounded by the semipermeable tent.

In one embodiment of the air purification tent, the air purification device comprises a filter, a fan or a blower and a structure to hold them.

In one embodiment of the air purification tent, the filter is arranged downstream the fan or blower to provide an efficient purification of the air before it enters the enclosed space.

In one embodiment of the air purification tent, the filter comprises an active carbon element for adsorbing gaseous pollutants.

In one embodiment of the air purification tent, the air purification device comprises a particle charging element to electrically charging particles in the air flowing through the air purifying device, and a filter adapted to enhance the particle arresting efficiency of the filter. This embodiment further improves the air purification since the charged particles more efficiently are collected in the filter.

In one embodiment of the air purification tent, the air filter of the air purification device is embodied as a particle filter bag enclosing the air outlet and extending from said air purification device on the inside of the enclosure. The filter bag may be made of a high efficiency filter media bag that hangs down into the enclosure. It is understood that the filter can be designed in a manner that it may be replaced from the inside of the enclosure without dismantling the whole system.

In one embodiment of the air purification tent, the particle charging element consists of an ionizer arranged upstream of said filter, said ionizer comprising a collector electrode and an emitter electrode, said collector electrode is arranged around an air passage extending through the air purification device and said emitter electrode is arranged in the centre of said passage. This embodiment provides a very efficient charging of the particles in the air flowing through the air purification device.

In one embodiment of the air purification tent, the air purifying device comprises a battery or means for electrically powering the ionizer and fan.

In a preferred embodiment of the invention, the semipermeable material is a natural or synthetic fibre textile, creating the likeness as well as the function of a high quality mosquito net or bed canopy.

In one embodiment of the air purification tent, the material has an air resistance value within the range 0.1-10 Pascal at the speed 10 cm/s.

The air purification tent of claim 1, wherein the area of the tent surrounding the air purification device consist of a less permeable material than the rest of the tent to prevent short circuiting of clean air in the air treatment device. This is favourable since the risk that clean air is circulating through the semipermeable material in the area of the air purification device instead of continuing downwards in the enclosed space towards the user resting on the platform. Since the air purification device preferably is arranged in the top of the upper area of the tent the less permeable material is arranged in the upper area of the tent to prevents possible short circuiting of clean air in the air treatment device.

In one embodiment of the invention, the entrance opening of the enclosure is closed with the embodiment walls on each side of the opening are overlapping. It is understood that the innate friction of the enclosure material will keep the sides from sliding apart, much like a conventional bed mosquito net.

In other embodiments of the invention, the entrance opening of the enclosure may be closed with magnets, zippers, hook, and loop fastening bands, pop buttons and buttons and holes.

In one embodiment of the invention, part of the tent or the entire tent may be lifted so that the user or users may enter the enclosure.

In one preferred embodiment of the invention the enclosure is suspended over the bed with a single ceiling hook and a structure of lightweight poles or pipes, forming a clear enclosure top face and side faces.

In one embodiment of the invention, the enclosure is suspended using strings or ropes in several corners of the top face of the enclosure. The strings are tied to ceiling or wall hooks. They may also be tied to a pole structure fixed to the platform, for example bedposts.

Additional aspects of the invention will be set forth in part in the description which follows and, in part, will be apparent from the description, or may be learned by practice of the invention.

DETAILED DESCRIPTION OF EMBODIMENTS

Figure 1:
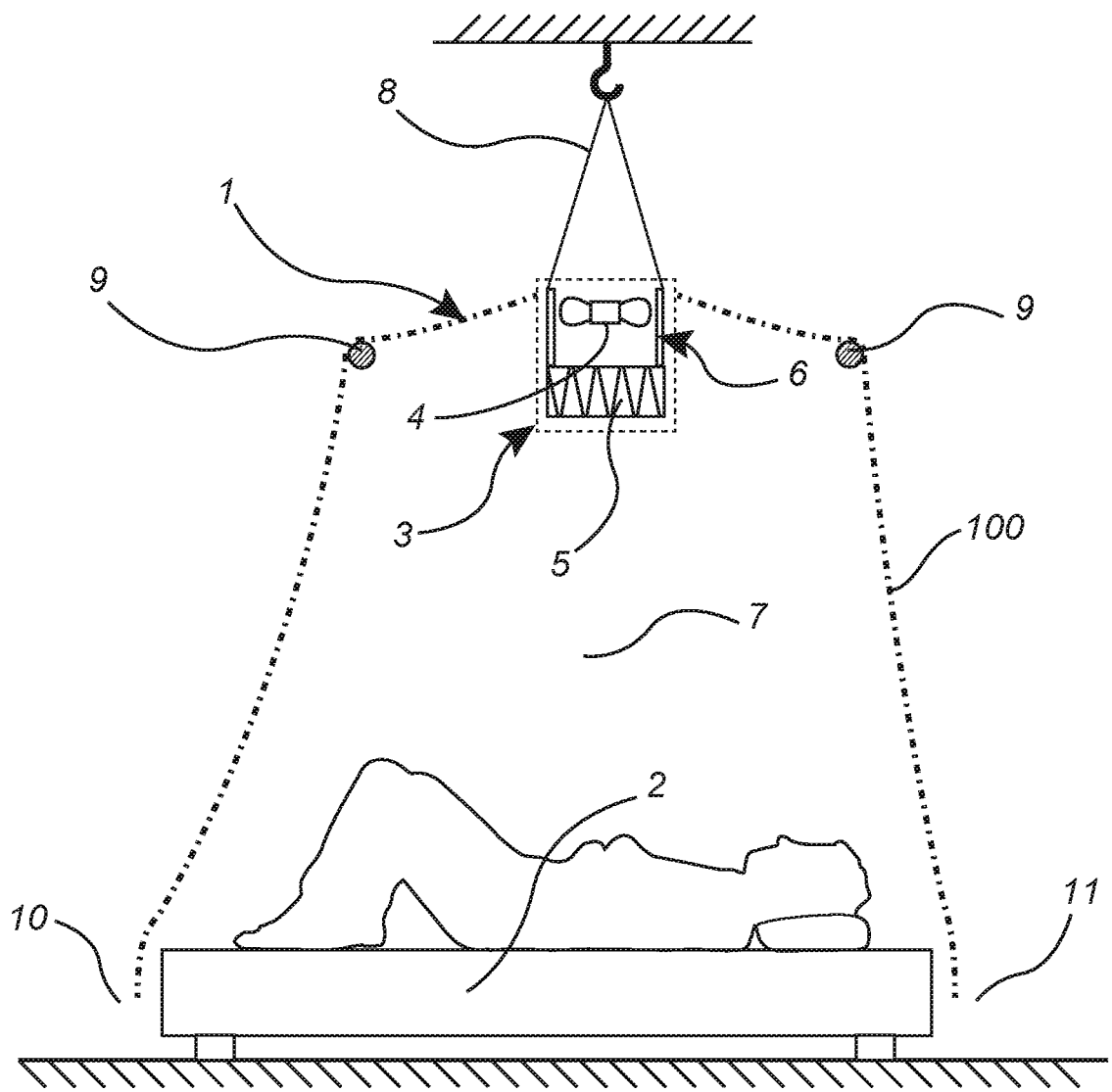
FIG. 1 shows a 2-dimensional schematic side view of the platform, the tent with a holding structure and the air purifying device.

FIG. 1 shows an example of the invention in a two-dimensional view, with the intended airflow shown in FIG.

Figure 4:
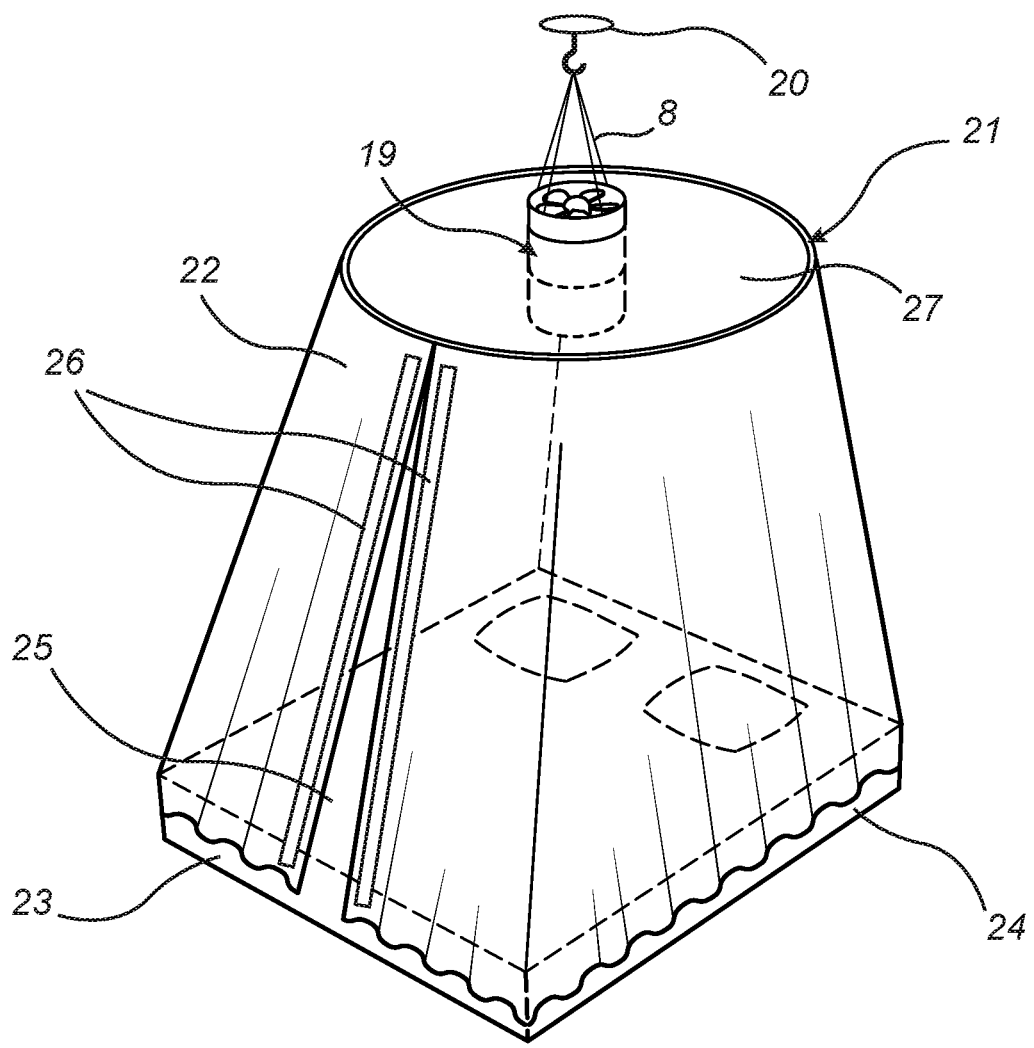
FIG. 4 shows a 3-dimensional schematic view of the platform, the tent with a holding structure and the air purifying device.
Figure 5:
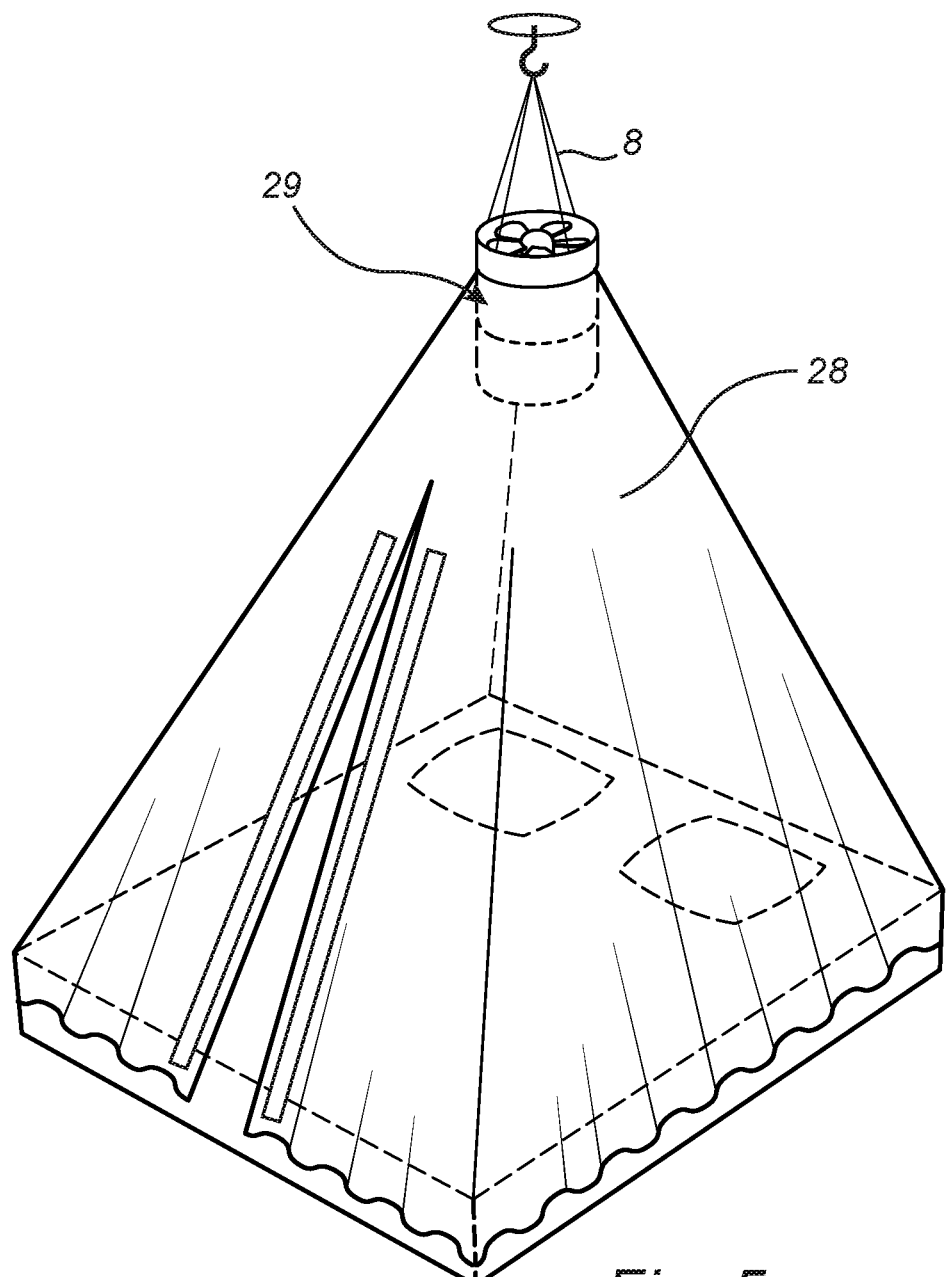
FIG. 5 shows a 3-dimensional schematic view of the platform, the tent without a holding structure and the air purifying device.
Figure 6:
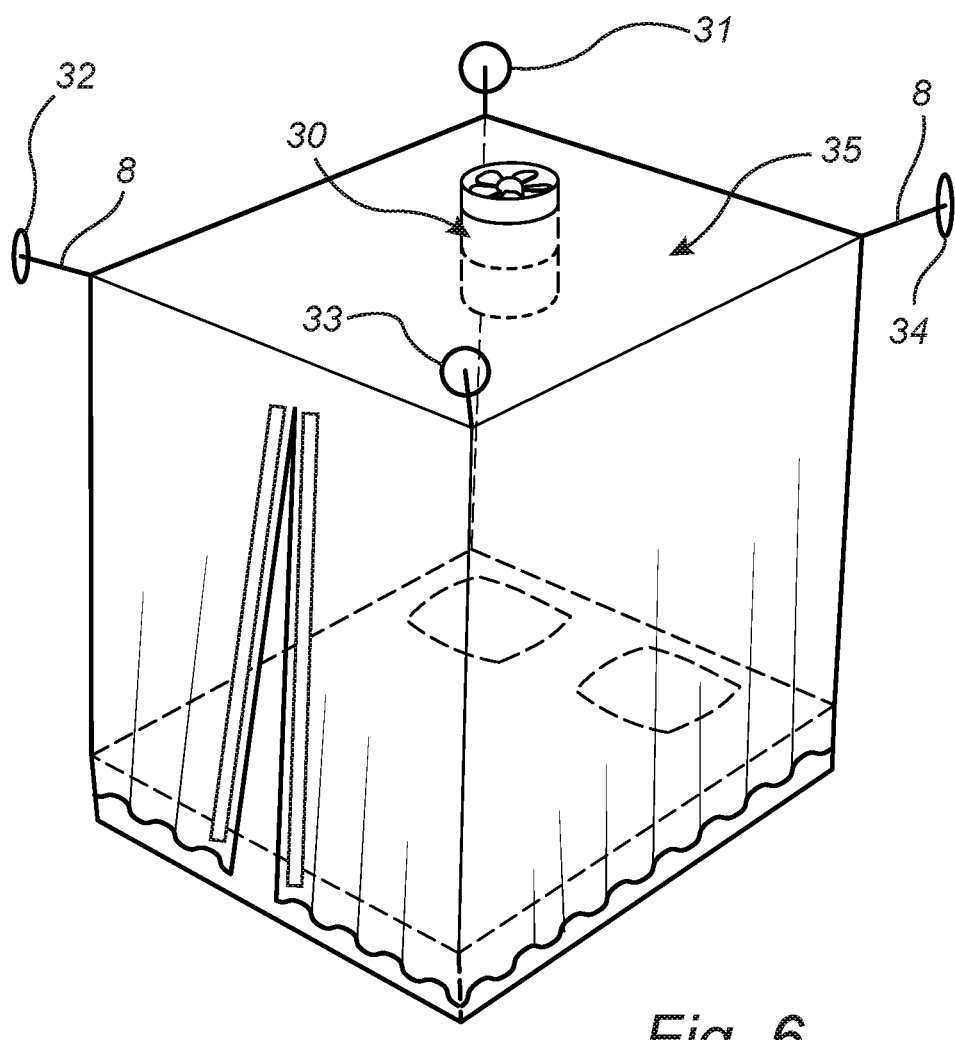
FIG. 6 shows 3-dimensional schematic view of the platform, the air purifying device, and an alternative suspension method for the tent.

2. A tent-like canopy (tent) 1 made from a semipermeable material 100 hangs over a platform 2 with the material skirting the sidewalls of the platform, so that the two together form an enclosed space 7. Creases in the material allows air to pass through easily around the platform side walls, shown here on two sides 10 and 11, also illustrated as 24 in the embodiment of the tent illustrated in FIG. 4. The tent-like canopy (tent) could be embodied in different ways such as a substantially flat flexible sheet of fabric that is suspended in one, or more, positions. The sheet of fabric is extending downwards such that it encloses the platform or bed. Further embodiments of the tent are illustrated in FIGS. 4, 5 and 6. These embodiments of the tent have a more tailored design to fit to a corresponding bed or platform.

In a preferred embodiment of the tent, the semipermeable material is made from fabric woven with a fiber and density as to let through air when subjected to a pressure differences between the enclosed space and the air surrounding the tent. As the air purifying device is arranged to direct air from the exterior of the tent to the enclosed space, the pressure during use is slightly higher within the enclosed space than in the surrounding air such that polluted air surrounding the tent is prevented from entering the enclosed space via the semipermeable material or the openings formed in the creases around the platform or bed.

The canopy may hang in an air purifying device 3, which may comprise a fan 4, a filter 5 and a structure 6 arranged to support the different components of the air purifying device in the intended position within the air purifying device. The disposition of the fan and filter, as well as the type of filter may vary. The air purifying device, in turn, is suspended by a suitable suspension device 8 for example attached to a ceiling hook using strings, wires, chains or any suitable equivalent. In a preferred embodiment, a structure 9, i.e. an annular rigid support, attached to the canopy holds the semipermeable material out from the air purifying device, providing a bigger enclosed space for the user. It is understood that a low voltage power can be supplied to the air purifying device by a cable running on the outside of the enclosure or dropped down on the inside of the enclosure.

Figure 2:
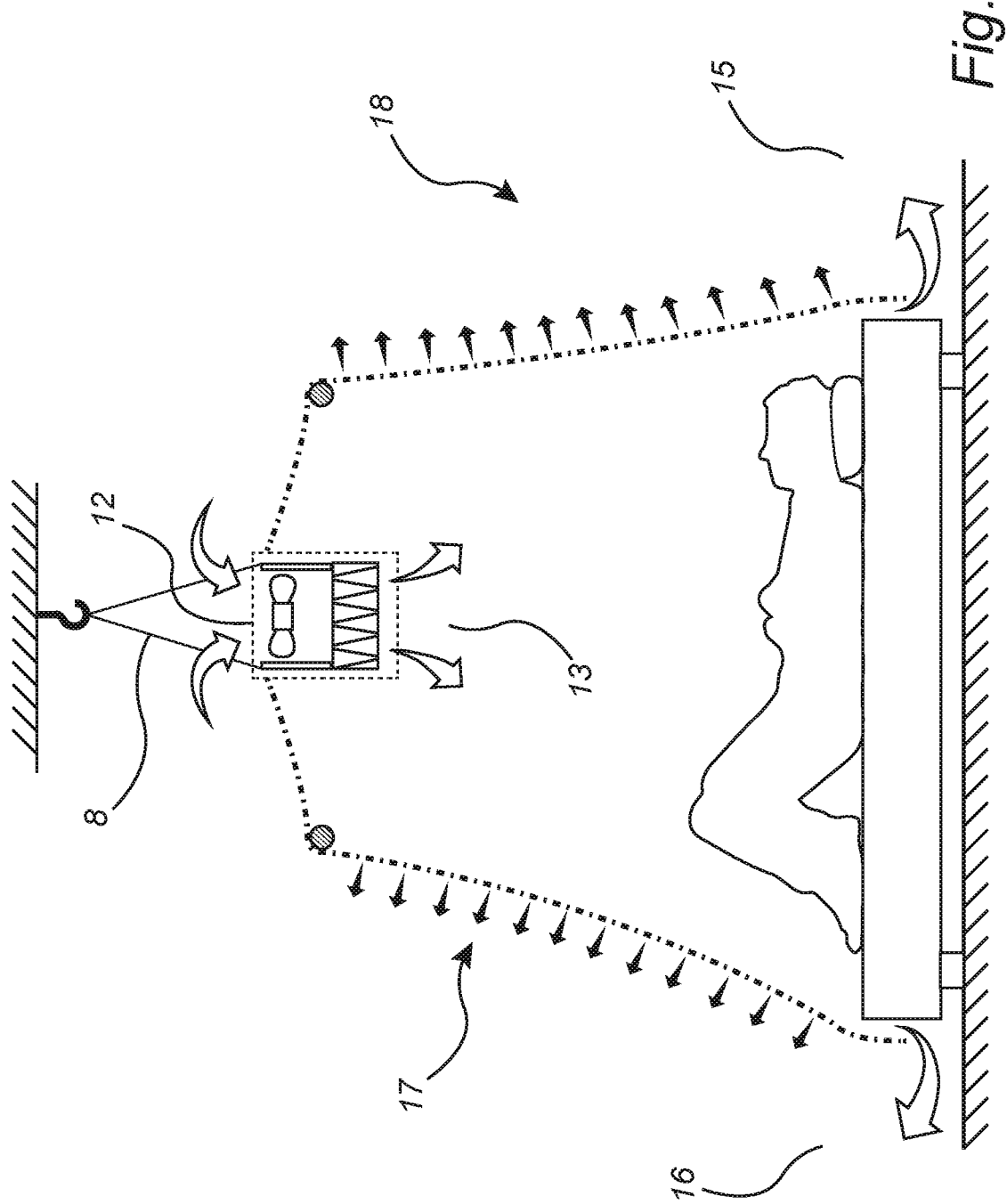
FIG. 2 shows the same schematic view as FIG. 1 with added indications for airflow through the enclosure.

FIG. 2 shows the same embodiment of the tent according to the invention. Dirty room air enters the part 12 of the air purifying device that is positioned on the outside of the enclosure. Purified air is let out through the air purifying device to the enclosed space 13. The relatively low but steady addition of air into the enclosure results in a positive pressure difference in the enclosed space, thereby pushing out enclosure air into the room through a plurality of openings formed by the creases of the semipermeable material formed around the sides of the platform, two sides 15 and 16 shown in the view. Air is also exiting the enclosed space via the semipermeable material, two sides shown by reference numerals 17 and 18, and through the not completely sealed opening 25 of the enclosure illustrated in FIG. 4.

The semipermeable nature of the tent material enables clean air to be let out of the enclosure even in the case of the outlets around the platform sides and the entrance openings are completely sealed, ensuring a stable performance in a variety of conditions and user handlings. Further, the positive pressure on the inside of the enclosure hinders polluted room air from entering the enclosure other than through said air purification device.

Figure 3:
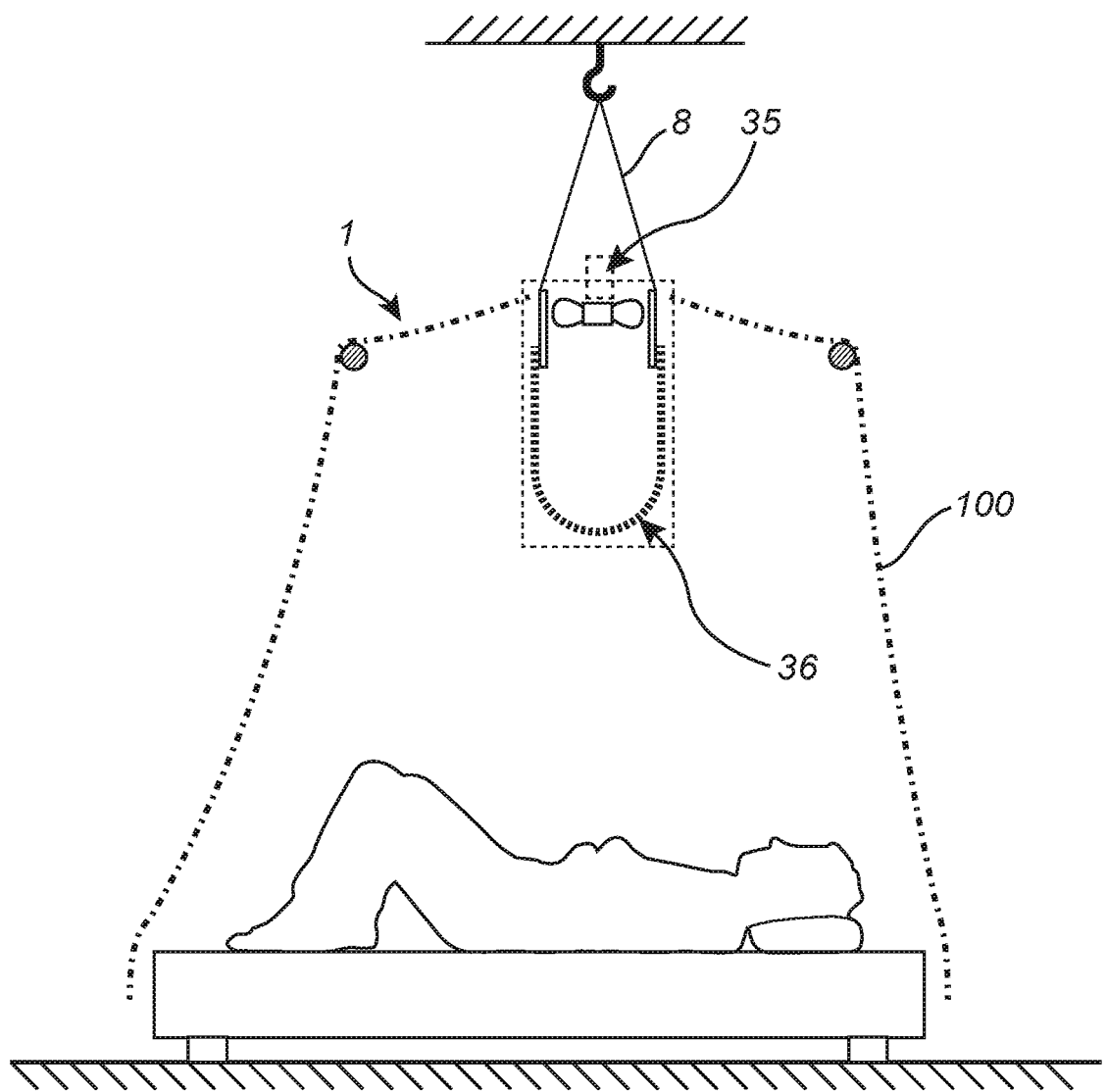
FIG. 3 shows a second embodiment of the air purifying device in the tent schematically illustrated in FIG. 1.

FIG. 3 shows a second embodiment of the tent illustrated in FIG. 1 and FIG. 2. In this embodiment the air purifying devices 35 comprises a particle charging element, for example a high voltage ionizer, to enhance the filtration efficiency. The air purifying device according to this embodiment is illustrated in detail in FIG. 7 and described further down in the detailed description. In this embodiment of the invention, the type of filter used is a high efficiency bag filter 36.

FIG. 4 shows an example of the tent according to the invention from a three-dimensional view. In this embodiment of the invention, the structure 21 that holds out the tent 22 out over the platform 23 may be circular in shape. The system may be held up by the tension in the tent material of the top surface of the enclosure 27 between the structure 21 and the air purifying device 19, which may be suspended in the ceiling 20.

In the illustrated embodiment of the invention, the enclosed space may be entered through an opening 25, or openings, of the semipermeable material. The opening, or openings, may be closed by adding fixtures to each side 26 of the opening 25. These fixtures may consist of magnets, zippers, hook, and loop fastening bands, pop buttons or buttons and holes. In one embodiment of the invention, there may be enough tent material to simply overlap the opening sides 26 sufficiently for them to close the opening. It is understood that the friction of the tent material surfaces will hold the sides in place.

In one embodiment of the invention, the top face 27 of the tent may consist of a less permeable material than the sides of the enclosure. This prevents clean air to be let out through the top surface and reduces the amount of clean air that would then be short circuited into the air purifying device.

FIG. 5 shows an example of an embodiment of the invention, where the semipermeable tent 28 may be fastened directly on the air purifying device 29.

FIG. 6 shows an example of an embodiment of the invention, where the semipermeable tent may be suspended by strings or the equivalent fastener in a plurality of fixture points 31, 32, 33, 34. The fixture points may consist of ceilings walls or other structures like bed poles. The air purifying device 30 may be suspended by the tension of the top surface material of the tent.

Figure 7:
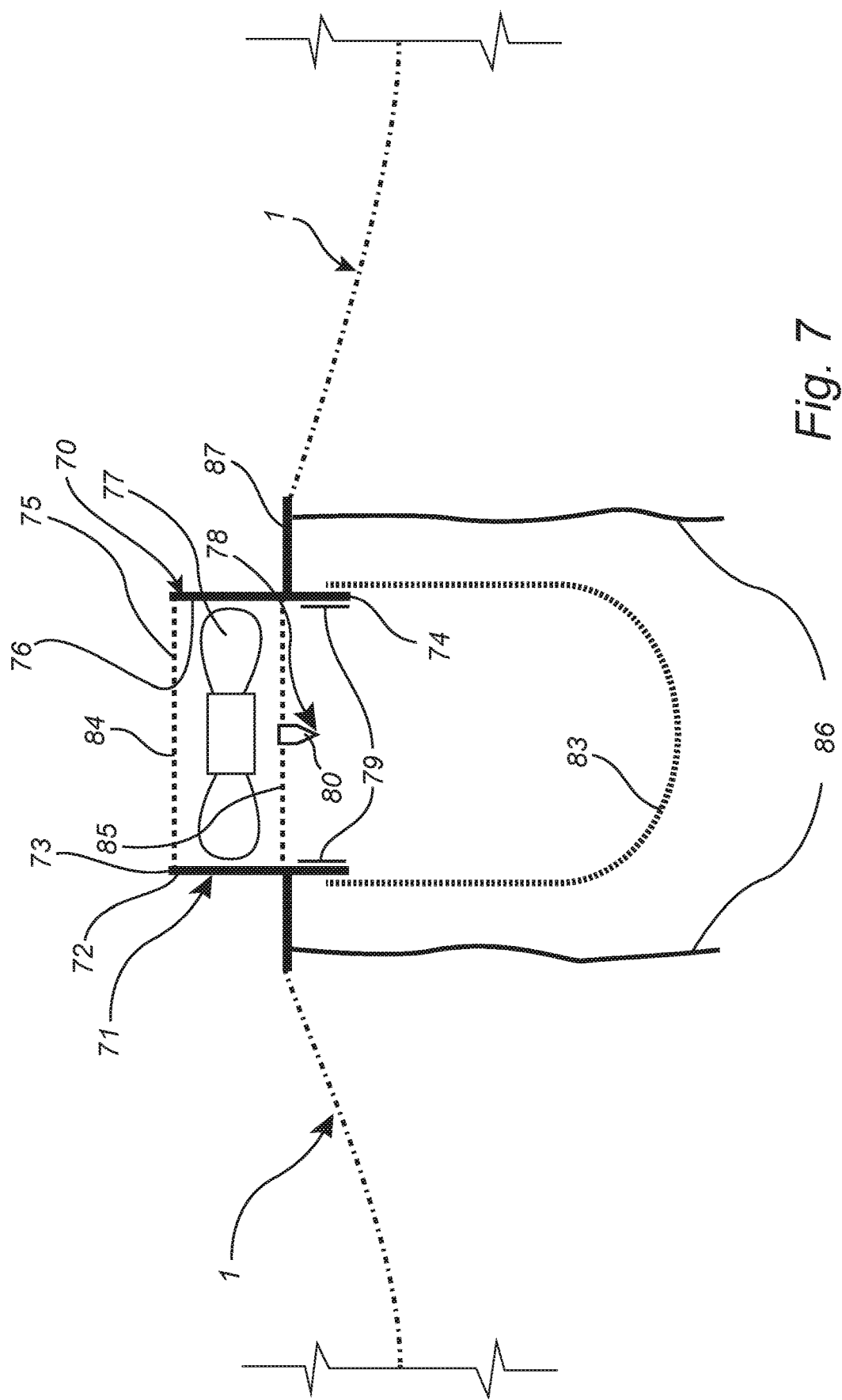
FIG. 7 illustrates a schematic cross-sectional view of one embodiment of an air purifying device.

One embodiment of the air purifying device is illustrated more in detail in FIG. 7. The air purifying device 70 comprises a support structure 71 arranged to support the different components of the air purifying device. The support structure is designed as a substantially circular housing 72. In the support device has a top side 73 intended to be facing upwards and a bottom side 74 intended to be facing downwards. In to top side an air inlet 75 is arranged. The air is then flowing through a substantially circular passage 75 extending vertically downwards to an air outlet 86 arranged within the enclosed space. In the passage 76 a fan 77 is arranged to generate the desired flow of air through the air purifying device 70. Downstream the fan, a particle charging element 78 is arranged to electrically charging particles in the air flowing through the air purifying device. The charged particles are then collected in a filter 83 adapted to enhance the particle arresting efficiency of the filter 83. The air filter 83 is embodied as a particle filter bag enclosing the air outlet and extending from said air purification device 70 on the inside of the enclosure.

The particle charging element 78 consists of an ionizer arranged upstream of said filter, said ionizer comprising a collector electrode 79 and an emitter electrode 80. The collector (anode) electrode 79 is arranged around the passage 75 extending through the air purification device, and said emitter electrode, i.e. cathode ionizer tip, is arranged in the centre of said passage.

The air purifying device furthermore comprises an air inlet grid 84 arranged to prevent unintentional larger items from entering the air inlet and an outlet safety grid 85 arranged on the opposite side of the fan as the inlet grid.

Furthermore, an annular hood 86 arranged around the air outlet is arranged to direct the clean air towards the intended position of a user, i.e. towards the platform. Furthermore, a flange 87 extending from the housing 72. The flange is intended to facilitate the fitting of the tent to the air purifying device. Preferably an opening with a shape and size corresponding to the size and shape of the exterior of the housing 72 is formed in the tent to make it easy to provide the desired leak proof sealing between the tent and the housing 72.

A person skilled in the art realizes that the present invention by no means is limited to the embodiments illustrated in the figures and described above. On the contrary, many modifications and variations are possible within the scope of the appended claims.

For example, the platform may consist of a baby crib with slatted or net-clad side walls which the semipermeable material will skirt in the same manner as described for bed-like platforms.

Further, the air purifier device may be fitted with alternative filtration methods, such as electrostatic filtration, photocatalytic oxidization filtration, active carbon gaseous adsorption as well as catalytic chemisorption.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An air purification tent comprising:
   a tent (1), at least partly made from a semipermeable flexible material, said tent is configured to be suspended above a platform (2) such that the material is enclosing the platform and an enclosed space is created;
   an air purification device (3, 19, 39, 30, 70) arranged in the tent, said device comprising an air inlet arranged at a top of the tent, outside the enclosed space, and directly exposed to an ambient environment, and an air outlet (86) arranged within the enclosed space;
   wherein the air purification device is suspended from a ceiling such that the tent extends downward from the air purification device;
   wherein the air inlet of the air purification device is directly exposed to the ambient environment, such that air from outside the tent directly enters the air inlet of the air purification device from above the tent so as to flow through the air purification device and into the enclosed space such that the enclosed space is filled with pure air; and
   wherein an area of the tent surrounding the air purification device comprises a less permeable material than the material suspended above the platform.

2. The air purification tent according to claim 1, wherein the air purification device (3, 19, 39, 30, 70) comprises an upper (73) and a lower side (74) and said air inlet is arranged in the upper side of the air purification device such that the air enters the inlet and flow substantially vertically downwards in the air purification device and exits the air purification device in the lower side of the device.

3. The air purification tent according to claim 1, wherein the tent comprises a closable opening (25), or openings, enabling one or more users to enter the enclosed space.

4. The air purification tent according to claim 1, wherein the air purification device (3, 19, 39, 30, 70) comprises a filter (5, 36, 83), a fan (4, 77) or blower, and an enclosure (6, 72) housing the filter and the fan or the blower.

5. The air purification tent of claim 4, wherein the filter (5, 36, 83) is arranged downstream the fan (4, 77) or blower.

6. The air purification tent of claim 4, wherein the filter (5, 36, 83) comprises an active carbon element for adsorbing gaseous pollutants.

7. The air purification tent according to claim 4, wherein the air purification device (70) comprises a particle charging element (78) to electrically charge particles in the air flowing through the air purification device, and the filter (83) adapted to enhance a particle arresting efficiency of the filter.

8. The air purification tent of claim 7, wherein the particle charging element (78) consists of an ionizer arranged upstream of said filter, said ionizer comprising a collector electrode (79) and an emitter electrode (80), said collector electrode is arranged around an air passage (76) extending through the air purification device and said emitter electrode is arranged in the centre of said air passage.

9. The air purification tent of claim 4, wherein the filter (83) of the air purification device is embodied as a particle filter bag enclosing the air outlet and extending from said air purification device on the inside of the enclosed space.

* * * * *